H. P. LILES.
GATE.
APPLICATION FILED JULY 24, 1908.
926,010.
Patented June 22, 1909.
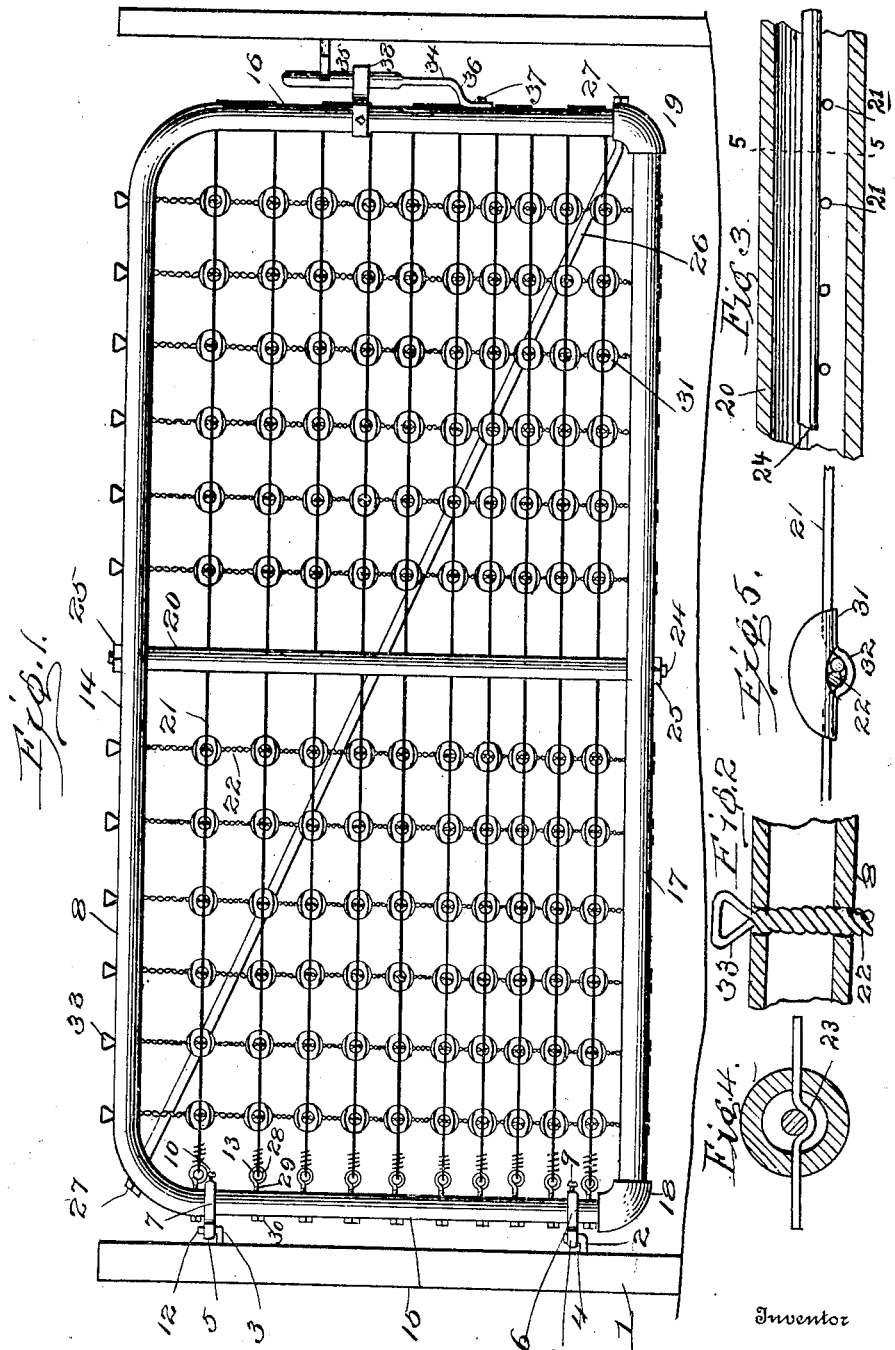

UNITED STATES PATENT OFFICE.

HARRY P. LILES, OF FOREST, OHIO, ASSIGNOR TO THE PERFECT GATE CO., A CORPORATION OF OHIO.

GATE.

No. 926,010.          Specification of Letters Patent.          Patented June 22, 1909.

Application filed July 24, 1908. Serial No. 445,211.

*To all whom it may concern:*

Be it known that I, HARRY P. LILES, citizen of the United States, residing at Forest, in the county of Hardin and State of Ohio, have invented certain new and useful Improvements in Gates; and I do hereby declare the following to be a full, clear, and exact description of the invention, such as will enable others skilled in the art to which it appertains to make and use the same.

This invention relates to improvements in gates, and has for an object the provision of a gate formed of tubular material and arranged to swing freely upon hinges adjustably secured thereto.

Another object of the invention is the provision of a gate having adjustable hinges mounted on one end of the gate and held in position by clamping means so as to be swung upon supporting pins at any desired height for adapting the gate to be swung upon various sized posts.

Another object of the invention is the provision of a gate provided with a framework and base extending transversely and diagonally across the framework, and wires extending from one end to the other and transversely of the framework for making the wire mesh inclosed by the framework, the wires making up the mesh being provided with means for bringing the same under tension.

A further object of the invention is the provision of a gate arranged with a pivotally mounted catch guided by a loop surrounding part of the framework of the gate and arranged to permit the catch to engage a notch in the keeper that is secured in the post positioned in proximity to the gate when closed.

A still further object in view is the provision of a gate having the framework thereof made from tubing and arranged with a hollow transverse brace and a tie rod extending diagonally across the gate for bracing the same, and also wires extending longitudinally and transversely of the framework, the longitudinally disposed bars passing through the transverse braces and locked against movement therein by a tie rod passing through the longitudinal brace that holds the longitudinally disposed wires in a locked position and also prevents the gate from spreading laterally.

With these and other objects in view the invention comprises certain novel constructions, combinations and arrangements of parts as will be hereinafter more fully described and claimed.

In the accompanying drawing: Figure 1 is a side elevation of a gate embodying the features of the present invention. Fig. 2 is an enlarged detail fragmentary view showing one end of one of the twisted wires embodying certain features of the invention. Fig. 3 is an enlarged detail fragmentary sectional view of a transverse brace. Fig. 4 is a section through Fig. 3 approximately on line 5—5. Fig. 5 is an enlarged detail fragmentary view of the cross wires at the point of crossing shown in connection with a locking washer for holding the same in position.

Referring to the drawing by numerals, 1 indicates a post to which is secured pins 2 and 3 that act as pintles for hinges 4 and 5 of the gate. Hinges 4 and 5 are constructed with inclosing portions 6 and 7 for inclosing or passing loosely about one end of the framework 8 of the gate. Set screws 9 and 10 pass through the inclosing portions 6 and 7 and engage the framework 8 for rigidly holding the respective hinges 4 and 5 in position. A second inclosure or apertured member 11 is provided for hinge 4, and an apertured member 12 is provided for hinge 5 to which the pins 2 and 3 are adapted to pass. By this construction and arrangement when it is desired to mount the gate upon any given post the pins or pintles 2 and 3 may be driven into the post 1 or secured thereto in any desired way and at any desired distance apart provided they are within the width of the gate. The hinges 4 and 5 may then be moved upon the framework 8 to a position corresponding with the pins 2 and 3 and then secured in place by set screws 9 and 10. If one of the tension members 13 should be in the way of moving the hinges along the framework 8 the same may be removed and the hinge forced along the framework to the desired position and then the tensioning means 13 replaced.

The gate proper is made up preferably of a framework 8 that is also preferably made with an upper member 14 being bent at the ends to form depending or end members 15 and 16. To the end members 15 and 16 is secured a bottom member or tube 17 by means of elbows 18 and 19. In order to prevent this framework from collapsing or from getting out of shape a brace or stay 20 is positioned substantially centrally of the gate and preferably made from tubular material. Through this brace is passed a plurality of wires or rods 21 that help to form a mesh when taken with wires 22. The wires or rods 21 when passing through brace or stay 20 are bent at 23 (Fig. 5) and are locked against any material longitudinal movement by a tie rod 24 that passes through brace or stay 20. Tie rod 24 may be secured in position by any desired means, but preferably is arranged with threaded ends and is tightened against the ends of stay 20 by means of nuts 25—25.

A stay rod 26, preferably a solid rod, is positioned diagonally across the gate, and also preferably from the lower front corner to the upper rear corner and is held in place by nuts 27—27 which are arranged upon the rod. By tightening up nuts 27—27 upon stay rod 26, and also by tightening up nuts 25—25 the framework of the gate may be held rigidly in correct position, and as will be evident will be thoroughly braced against the various strains to which a gate is subjected.

The wires or rods 21 are secured to tension and securing members 13 at one end of the gate preferably at the end upon which the hinge is mounted. Tension member 13 is formed with an eye 28 and a threaded portion 29 which projects through the framework 8 and is engaged by a nut 30. In constructing the gate one end of the rod or wire is secured to eye 28 and then is passed longitudinally of the gate through an aperture in end 16, then a short distance longitudinally of the end 16 and through another aperture and back to the rear end of the gate and secured to an eye 28 to another tensioning member 13. The wires or rods 21 may be spaced any desired distance apart and are each provided with a tensioning member 13 for bringing the same under the proper tension. After the gate has been in use for some time the various wires 21 may be easily tightened if the same should become loosened by simply tightening up the nuts 30. The wires 21 in passing longitudinally of the gate pass through the stay 20 and are held by tie rod 24 against any material longitudinal movement, though the strain brought upon the wires by tension member 13 will be sufficient to move the wires longitudinally for bringing the wires under proper tension. The wires 21 are also properly spaced by passing through stay 20 and in addition are held spaced by the cross wires 22 which are preferably a pair of wires twisted together or what might be more strictly termed a single loop of wire extending from the base 17 to the upper member 14 and twisted to conform to the wires 21.

A tie washer 31 is positioned at the point at which wires 22 pass wires 21, and by reason of the tie washer 31 holding wires 21 in the notches formed by the twist of wires 22 firmly lock both wires against movement, wire 21 being bent around wire 22 at 32. In twisting wires 22 it will be observed that a continuous circular surface will be presented as in ordinary wire so that the depressed or bent down portions 32 may raise in the notches or the depressions formed by the wavy formation of wires 22 and thus be prevented from moving longitudinally of wires 22, and consequently sagging from their correct position. In positioning wires 22 in the framework 8 a single wire is preferably taken and bent double and twisted until it forms a heavy wire or cable, and is then threaded through apertures in member 14 and is passed downward over the respective wires 21 and through the tie washer 31, and finally through the lower tube or member 17 and have their ends bent over against the tube as clearly shown in Fig. 1. A loop 33 is left projecting from the top of the gate through which a bar of metal or tool may be passed and the wires 22 twisted until the proper tension is created therein. After the gate has been used if wires 22 should become loosened for any reason a tool may be passed through the loops 33 and the same given any desired number of turns for tightening up the wires. If desired the loops 33 may be slightly flattened so as to prevent any tendency of the same to be drawn through the upper part of the framework 8.

Secured to the end 16 is a catch 34 that is formed with an engaging portion 35 and a spring portion 36. The catch is bolted or pivoted at 37 to end 16 so as to permit the engaging portion 35 to be moved forward or from the gate. In order to guide the movement of the engaging portion 35 and prevent any twisting of the same a guiding member 38 is rigidly secured to end 16 preferably by passing around the same and being bolted thereto. Guide 38 will permit sufficient movement of engaging portion 35 to allow the same to be disengaged from a keeper 39 secured to a post 40. The keeper 39 is provided with a notch 41 and beveled sides 42—42, beveled sides 42—42 permitting the catch 35 to slide over the same and snap into notch 41 when the gate is swung shut from either direction.

By the construction of gate set forth and the way the same is mounted it will be seen that the gate may be opened in either direction and when given a sufficient push will close itself and catch 34 will lock the same in a closed position.

What I claim is:

1. In a gate, parallel wires extending across the frame in one direction, wires extending across the frame in another direction and having looped ends extending through the frames, and providing means to insert an implement to twist the wires, and means embracing the points of crossing of the wires adapted to clamp the wires at such points of crossing.

2. In a gate, a rigid frame, parallel wires extending across the gate in one direction, means to exert tension upon such parallel wires, wires extending across the gate in another direction and crossing with the first-mentioned wires, such wires being doubled and having their folded ends extending through the frame and providing a loop upon the exterior of the frame adapted to receive an implement to twist such wires, and tie washers embracing the wires at their points of crossing and adapted to clamp such wires together.

3. In a gate, a frame, parallel wires extending entirely across the frame in one direction, twisted wires extending entirely across the frame in another direction and forming junctures with the first mentioned wires at a plurality of points, and loops formed on the ends of said twisted wires for receiving an implement for twisting the same.

4. In a gate, a frame, parallel wires extending entirely across the frame in one direction, twisted wires extending across the frame in another direction and entirely through said frame and forming junctures with said first mentioned wires at a plurality of points, and loops formed upon the said wires extending through said frame for receiving an instrument for twisting said wires for regulating the tension thereof.

In testimony whereof I affix my signature in presence of two witnesses.

HARRY P. LILES.

Witnesses:
W. B. PRICE,
LAWRENCE MILLER.